United States Patent
Sakamoto (10) Patent No.: US 6,172,818 B1
(45) Date of Patent: Jan. 9, 2001

(54) ZOOM LENS SYSTEM (75) Inventor: Keijiro Sakamoto, Okazaki (JP)

(73) Assignee: Minolta Co., Ltd., Osaka (JP)

(*) Notice: Under 35 U.S.C. 154(b), the term of this patent shall be extended for 0 days.

(21) Appl. No.: 09/333,906

(22) Filed: Jun. 16, 1999

(30) Foreign Application Priority Data

Jun. 19, 1998 (JP) .................................................. 10-172570

(51) Int. Cl.$^7$ .................................................. G02C 15/14
(52) U.S. Cl. .......................................... 359/689; 359/683
(58) Field of Search .................................. 359/676, 683, 359/689, 679

(56) References Cited

U.S. PATENT DOCUMENTS

| | | | |
|---|---|---|---|
| 4,474,436 | 10/1984 | Itoh ...................................... | 359/691 |
| 5,268,790 | 12/1993 | Chen ..................................... | 359/687 |
| 5,717,525 | 2/1998 | Estelle et al. ......................... | 359/689 |
| 5,731,914 | 3/1998 | Meyers ................................. | 359/683 |
| 5,745,301 | * 4/1998 | Betensky et al. .................... | 359/689 |
| 5,991,096 | * 11/1999 | Estelle ................................ | 351/689 |

FOREIGN PATENT DOCUMENTS

| | | |
|---|---|---|
| 4-214516 | 8/1992 | (JP) . |
| 6-94993 | 4/1994 | (JP) . |
| 6-242373 | 9/1994 | (JP) . |
| 9-197273 | 7/1997 | (JP) . |
| 9-197274 | 7/1997 | (JP) . |

\* cited by examiner

*Primary Examiner*—Scott J. Sugarman
(74) *Attorney, Agent, or Firm*—Burns, Doane, Swecker & Mathis, LLP (57) ABSTRACT

A zoom lens system has, from the enlargement side, a first lens unit having a negative optical power and having a lens element including a diffractive optical surface, a second lens unit having a positive optical power, and a third lens unit. Zooming is performed by varying the distances among the first through third lens units. The following conditions are fulfilled:

$$|\phi Dn/\phi 1|<0.06$$

$$-0.8<\phi n/\phi W<-0.3$$

where $\phi Dn$ represents the diffractive optical power of the first lens unit, $\phi 1$ represents the refractive optical power of the lens element including the diffractive optical surface, $\phi n$ represents the composite optical power of the diffractive and refractive optical powers of the first lens unit, and $\phi W$ represents the composite optical power of the diffractive and refractive optical powers of the entire lens system in the shortest-focal-length condition.

15 Claims, 8 Drawing Sheets

ZOOM LENS SYSTEM

This application is based on application No. H10-172570 filed in Japan, the content of which is hereby incorporated by reference.

BACKGROUND OF THE INVENTION

1. Field of the Invention

The present invention relates to a zoom lens system, particularly to an image-reading zoom lens system for use as a high-definition finite-conjugate-distance zoom lens system in an image copying apparatus, image reading apparatus, or the like.

2. Description of the Prior Art

Conventionally, a lens system designed for use in an image copying or reading apparatus is typically built as a fixed-focal-length lens system that offers fixed reading magnification. Even if such a lens system is designed to offer variable reading magnification, the range of magnification it offers is usually very limited. Customarily, reading magnification is varied either electrically or optically. For example, Japanese Laid-open Patent Applications Nos. H6-94993 and S57-73715 propose varying reading magnification by the use of a variable-focus lens.

On the other hand, increasing attention has been paid to a technique that allows proper correction of chromatic and other aberrations by combining a diffractive optical element with a refractive optical element. For example, Japanese Laid-open Patent Application No. H6-242373 proposes an objective lens system based on this technique for use in an optical disk apparatus. Moreover, U.S. Pat. No. 5,268,790 proposes applying the technique to a lens system for use in a video apparatus, and Japanese Laid-open Patent Application No. H4-214516 proposes applying the technique to a lens system for use in a stepper.

However, the variable-magnification lens system proposed in Japanese Laid-open Patent Application No. H6-94993 mentioned above requires a large variation in the conjugate distance, and thus cannot be made practically compact. On the other hand, the zoom lens system proposed in Japanese Laid-open Patent Application No. S57-73715 mentioned above allows the conjugate distance to be fixed, but is unduly large as a whole, and in addition suffers from too large aberrations such as distortion to be used for a high-definition image reading.

The objective lens system proposed in Japanese Laid-open Patent Application No. H6-242373 for use in an optical disk apparatus is designed for a narrow wavelength range. Thus, if used in an optical system that employs a halogen lamp, this lens system suffers from chromatic aberration. Moreover, the lens system for use in a video apparatus proposed in U.S. Pat. No. 5,268,790 is not so designed that the diffractive optical element provided therein contributes to a reduction in the number of the constituent lens elements of the entire lens system. Furthermore, the lens system proposed in Japanese Laid-open Patent Application No. H4-214516 for use in a stepper is unfit for use in an optical system that employs a halogen lamp, for the same reason as noted above for the objective lens system proposed in Japanese Laid-open Patent Application No. H6-242373 for use in an optical disk apparatus.

SUMMARY OF THE INVENTION

An object of the present invention is to provide a compact high-resolution zoom lens system that corrects chromatic and other aberrations properly.

To achieve the above object, according to one aspect of the present invention, a zoom lens system is provided with, from the enlargement side, a first lens unit, a second lens unit, and a third lens unit. The first lens unit has a negative optical power and has a lens element including a diffractive optical surface. The second lens unit has a positive optical power. In this zoom lens system, a zooming operation is performed by varying the distances among the first through third lens units. In addition, the zoom lens system fulfills the following conditions:

$$|\phi Dn/\phi 1|<0.06$$

$$-0.8<\phi n/\phi W<-0.3$$

where $\phi Dn$ represents the diffractive optical power of the first lens unit;

$\phi 1$ represents the refractive optical power of the lens element including the diffractive optical surface;

$\phi n$ represents the composite optical power of the diffractive and refractive optical powers of the first lens unit; and $\phi W$ represents the composite optical power of the diffractive and refractive optical powers of the entire lens system in the shortest-focal-length condition.

According to another aspect of the present invention, a zoom lens system is provided with, from the enlargement side, a first lens unit, a second lens unit, and a third lens unit. The first lens unit has a negative optical power. The second lens unit has a positive optical power. The third lens unit has a negative optical power and has a lens element including a diffractive optical surface. In this zoom lens system, a zooming operation is performed by varying the distances among the first through third lens units. In addition, the zoom lens system fulfills the following conditions:

$$|\phi Dn/\phi 3|<0.06$$

$$-0.8<\phi n/\phi W<-0.3$$

where $\phi Dn$ represents the diffractive optical power of the third lens unit;

$\phi 3$ represents the refractive optical power of the lens element including the diffractive optical surface;

$\phi n$ represents the composite optical power of the diffractive and refractive optical powers of the third lens unit; and $\phi W$ represents the composite optical power of the diffractive and refractive optical powers of the entire lens system in the shortest focal length condition.

According to another aspect of the present invention, a finite-conjugate-distance zoom lens system for reading a two-dimensional image is provided with, from the enlargement side, a first lens unit, a second lens unit, and a third lens unit. The first lens unit has a negative optical power and has a lens element including a diffractive optical surface. The second lens unit has a positive optical power. In this zoom lens system, a zooming operation is performed by varying the distances among the first through third lens units. In addition, the zoom lens system fulfills the following conditions:

$$|\phi Dn/\phi 1|<0.06$$

$$-0.8<\phi n/\phi W<-0.3$$

where

φDn represents the diffractive optical power of the first lens unit;

φ1 represents the refractive optical power of the lens element including the diffractive optical surface;

φn represents the composite optical power of the diffractive and refractive optical powers of the first lens unit; and φW represents the composite optical power of the diffractive and refractive optical powers of the entire lens system in the shortest-focal-length condition.

According to another aspect of the present invention, a finite-conjugate-distance zoom lens system for reading a two-dimensional image is provided with, from the enlargement side, a first lens unit, a second lens unit, and a third lens unit. The first lens unit has a negative optical power. The second lens unit has a positive optical power. The third lens unit has a negative optical power and has a lens element including a diffractive optical surface. In this zoom lens system, a zooming operation is performed by varying the distances among the first through third lens units. In addition, the zoom lens system fulfills the following conditions:

$|\phi Dn/\phi 3|<0.06$ $-0.8<\phi n/\phi W<-0.3$ where

φDn represents the diffractive optical power of the third lens unit;

φ3 represents the refractive optical power of the lens element including the diffractive optical surface;

φn represents the composite optical power of the diffractive and refractive optical powers of the third lens unit; and φW represents the composite optical power of the diffractive and refractive optical powers of the entire lens system in the shortest-focal-length condition.

According to still another aspect of the present invention, a finite-conjugate-distance zoom lens system for reading a two-dimensional image is provided with, from the enlargement side, a first lens unit, a second lens unit, and a third lens unit. The first lens unit has a negative optical power and has a lens element including a diffractive optical surface. The second lens unit has a positive optical power. In this zoom lens system, a zooming operation is performed by varying the distances among the first through third lens units.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Hereinafter, zoom lens systems embodying the present invention will be described with reference to the drawings.

Figure 1:
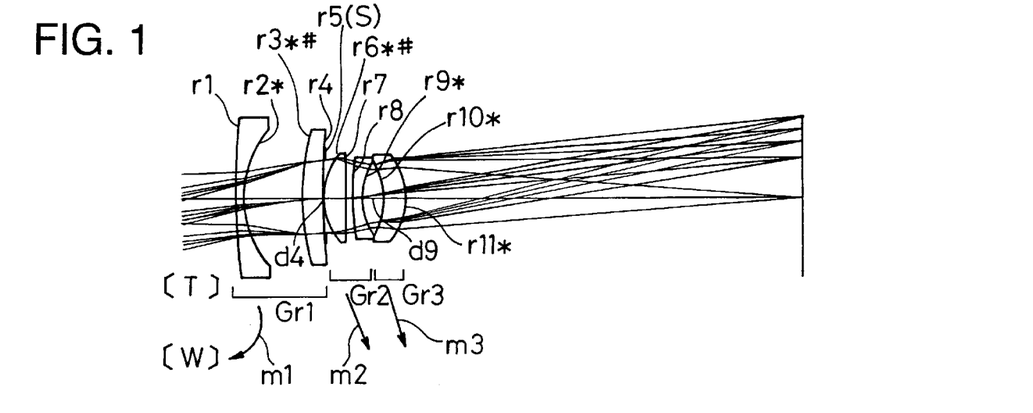
FIG. 1 is a diagram showing the lens arrangement of the zoom lens system of a first embodiment (Example 1) of the present invention.
Figure 2:
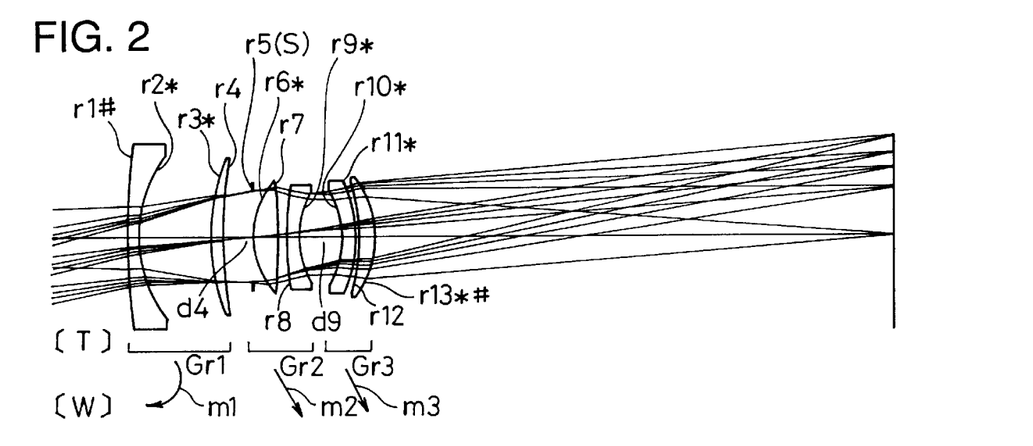
FIG. 2 is a diagram showing the lens arrangement of the zoom lens system of a second embodiment (Example 2) of the present invention.
Figure 3:
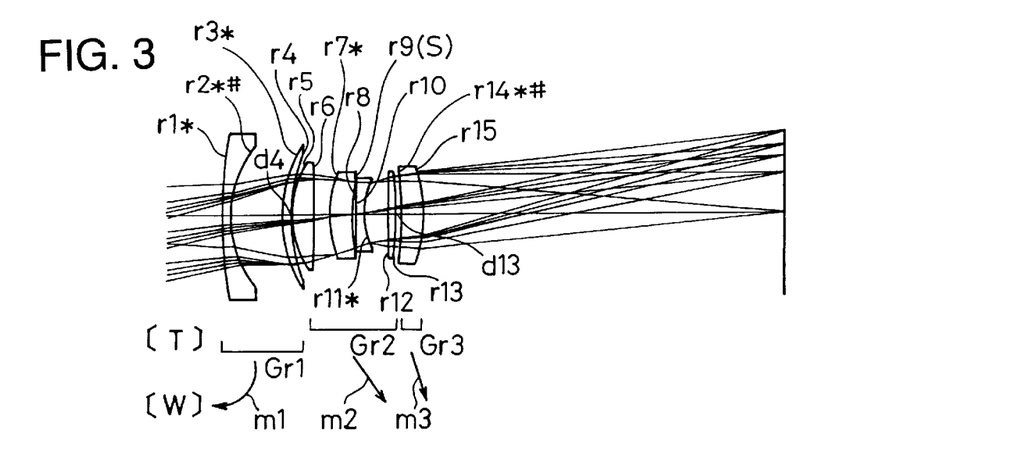
FIG. 3 is a diagram showing the lens arrangement of the zoom lens system of a third embodiment (Example 3) of the present invention.
Figure 4:
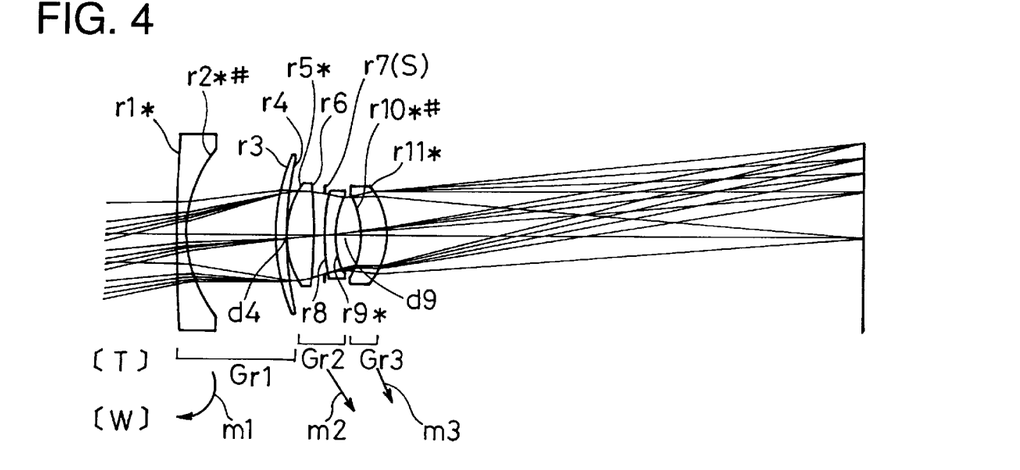
FIG. 4 is a diagram showing the lens arrangement of the zoom lens system of a fourth embodiment (Example 4) of the present invention.
Figure 5:
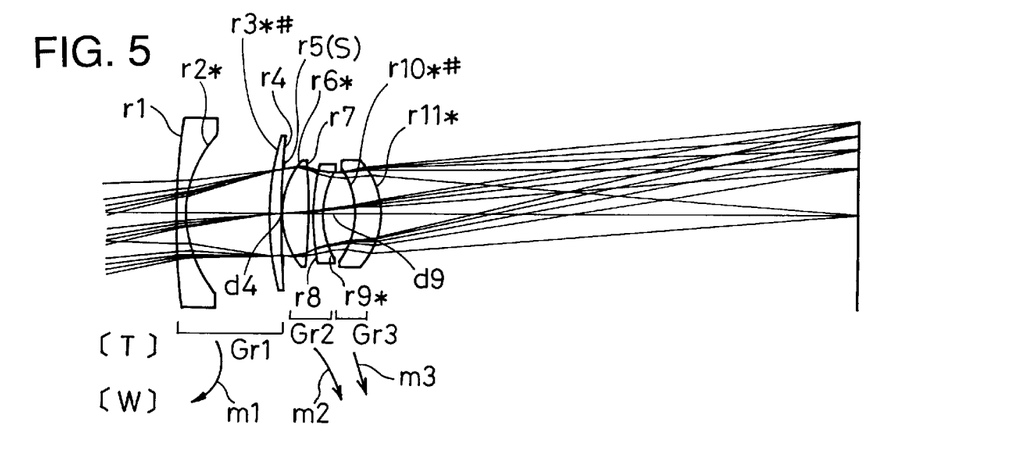
FIG. 5 is a diagram showing the lens arrangement of the zoom lens system of a fifth embodiment (Example 5) of the present invention.
Figure 6:
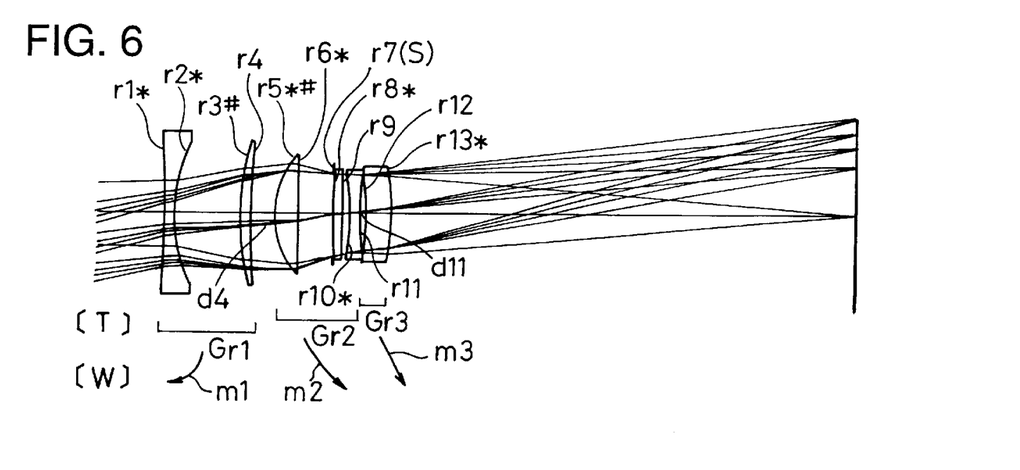
FIG. 6 is a diagram showing the lens arrangement of the zoom lens system of a sixth embodiment (Example 6) of the present invention.

FIGS. 1 to 6 are lens arrangement diagrams of the zoom lens systems of a first, a second, a third, a fourth, a fifth, and a sixth embodiment, respectively, each figure illustrating the lens arrangement in the longest-focal-length condition [T]. In these diagrams, arrow mj (j=1, 2, and 3) schematically indicates the movement of the jth lens unit (Grj) during zooming from the longest-focal length condition [T] to the shortest-focal-length condition [W], ri (i=1, 2, 3, . . . ) represents the ith surface counted from the enlargement side, and di (i=1, 2, 3, . . . ) represents the ith axial distance counted from the enlargement side, though only those axial distances that vary with zooming (i.e. variable axial distances) are indicated. Moreover, a surface ri marked with an asterisk (*) is an aspherical surface, and a surface ri marked with # is a diffractive surface, i.e. a refractive surface having a diffractive optical element formed thereon.

The zoom lens systems of the first to sixth embodiments are all composed of three lens units which are, from the enlargement side, a first lens unit (Gr1) having a negative optical power, a second lens unit (Gr2) having a positive optical power, and a third lens unit (Gr3) having a positive optical power (or a negative optical power, as required). The zoom lens systems of these embodiments are all characterized in that zooming is achieved by moving the individual lens units along the optical axis, and in that a diffractive optical element is provided at least on one surface within the first lens unit (Gr1) having a negative optical power. A diffractive optical element exhibits a negative dispersion as high as −3.45, which cannot be obtained by the use of a common lens material. In each embodiment, this high dispersion is exploited to correct chromatic aberration in particular. As a result, it is possible to reduce the number of lens elements required in each lens unit and thereby make the entire zoom lens system compact. Moreover, since proper correction of chromatic aberration is achieved within each lens unit, it is possible to enhance the optical performance of the entire zoom lens system. Note that configuring the entire zoom lens system so that it is basically composed of a negatively-powered and a positively-powered section makes it possible to secure a sufficient back focal length for disposing a color-separating system and others.

Providing a diffractive optical element in the first lens unit (Gr1) having a negative optical power allows the first lens unit (Gr1) to require only two lens elements for proper correction of aberrations. If chromatic and other aberrations are corrected properly within the first lens unit (Gr1), it is possible to alleviate the burden on the second lens unit (Gr2). This helps simplify the configuration of the second lens unit (Gr2). Moreover, by providing a diffractive optical element in the second, or the third, lens unit (Gr2 or Gr3) having a positive optical power, it is possible to make compact the second and third lens units (Gr2 and Gr3), which are used to achieve zooming, and it is also possible to minimize the distances through which these lens units are moved during zooming, and thereby make the entire zoom lens system compact. This even leads to higher optical performance.

As described above, in the zoom lens systems of the first to sixth embodiments, by exploiting the ability of a diffractive optical element to correct chromatic aberration, it is possible to realize a compact, low-cost, and high-performance zoom lens system that corrects chromatic and other aberrations properly with as few as five to seven lens elements in total. By effective use of a diffractive optical element, it is possible to minimize the number of lens elements required in each lens unit while keeping high optical performance sufficient for color image reading. This helps reduce the size and costs of image copying and image reading apparatuses. The conditions to be fulfilled by the zoom lens systems of the embodiments to obtain optimal optical performance will be described below. Note that, in the following descriptions, for simplicity's sake, unless indicated otherwise, all the lens units having a positive/negative optical power, all the diffractive optical elements, all the lens elements having a diffractive optical element provided thereon, etc, throughout the entire zoom lens system, will be referred to simply as "the lens unit having a positive/negative optical power", "the diffractive optical element", "the lens element having a diffractive optical element provided thereon", etc.

In a three-unit zoom lens system of a negative-positive-positive (or negative-positive-negative) configuration, it is preferable that a diffractive optical element be provided at least on one surface within the lens unit having a negative optical power, and that the following condition (1) be fulfilled:

$$|\phi Dn/\phi 1|<0.06 \qquad (1)$$

where
  φDn represents the diffractive optical power of the lens unit having a negative optical power; and
  φ1 represents the refractive optical power of the lens element having the diffractive optical element provided thereon and provided in the lens unit having a negative optical power.

Condition (1) defines the ratio of the diffractive power of the diffractive optical element provided in the lens unit having a negative optical power (i.e., in the first to sixth embodiments, the first lens unit (Gr1)) to the total optical power of the single lens element having the diffractive optical element provided thereon. If the value of Condition (1) is greater than its upper limit, the optical power of the diffractive optical element is so strong that not only chromatic aberration but also spherical aberration is overcorrected.

In a three-unit zoom lens system of a negative-positive-positive (or negative-positive-negative) configuration, it is preferable that a diffractive optical element be provided at least on one surface within the lens unit having a negative optical power, and that the following condition (2) be fulfilled. Here, it is preferable that Condition (1) noted above be fulfilled simultaneously.

$$-0.8<\phi n/\phi W<-0.3 \qquad (2)$$

where
  φn represents the composite optical power of the diffractive and refractive optical powers of the lens unit having a negative optical power; and
  φW represents the composite optical power of the diffractive and refractive optical powers of the entire lens system in the shortest-focal-length condition [W].

Condition (2) defines the ratio of the optical power of the lens unit having a negative optical power (i.e., in the first to sixth embodiments, the first lens unit (Gr1)) to the optical power of the entire zoom lens system in the shortest-focal-length condition [W]. If the value of Condition (2) is greater than its upper limit, spherical aberration and other aberrations are undercorrected and the total length of the zoom lens system varies too greatly during zooming. In contrast, if the value of Condition (2) is less than its lower limit, although it is possible to make the zoom lens system as a whole compact, coma aberration and distortion vary too greatly. This makes it difficult to secure satisfactory optical performance.

In a three-unit zoom lens system of a negative-positive-positive configuration, it is preferable that a diffractive optical element be provided at least on one surface within the first lens unit (Gr1) and at least on one surface within the second or third lens unit (Gr2 or Gr3), and that the following condition (3) be fulfilled. Here, it is preferable that Conditions (1) and (2) noted above be fulfilled simultaneously.

$$-1.0 < \phi n/\phi p < -0.4 \tag{3}$$

where $\phi n$ represents the composite optical power of the diffractive and refractive optical powers of the lens unit having a negative optical power (i.e. the first lens unit (Gr1)); and $\phi p$ represents the composite optical power of the diffractive and refractive optical powers of the lens unit having a positive optical power (i.e. the second and third lens units (Gr2 and Gr3)).

Condition (3) defines the ratio of the optical power of the lens unit having a negative optical power to the optical power of the lens unit having a positive optical power. If the value of Condition (3) is greater than its upper limit, it is possible to weaken the optical power of each lens unit and thereby make corrections of aberrations easier, but the total length of the zoom lens system becomes too long, and thus the total length of the zoom lens system varies too greatly during zooming. In contrast, if the value of Condition (3) is less than its lower limit, although it is possible to make the zoom lens system as a whole compact, coma aberration and distortion vary too greatly.

In a three-unit zoom lens system of a negative-positive-positive configuration, it is preferable that a diffractive optical element be provided at least on one surface within the first lens unit (Gr1) and at least on one surface within the second or third lens unit (Gr2 or Gr3), and that the following condition (4) be fulfilled. Here, it is preferable that Conditions (1) to (3) noted above be fulfilled simultaneously.

$$0.01 < |\phi Dp/\phi p| < 0.10 \tag{4}$$

where $\phi Dp$ represents the diffractive optical power of the lens unit having a positive optical power (i.e. the second and third lens units (Gr2 and Gr3)); and $\phi p$ represents the composite optical power of the diffractive and refractive optical powers of the lens unit having a positive optical power (i.e. the second and third lens units (Gr2 and Gr3)).

Condition (4) defines the total optical power of the diffractive optical element provided in the lens unit having a positive optical power. If the value of Condition (4) is greater than its upper limit, the optical power of the diffractive optical element is too strong, and thus chromatic aberration is undercorrected. In contrast, if the value of Condition (4) is less than its lower limit, the optical power of the diffractive optical element is too weak, and thus chromatic aberration is overcorrected.

In a three-unit zoom lens system of a negative-positive-positive configuration, it is preferable that a diffractive optical element be provided at least on one surface within the first lens unit (Gr1) and at least on one surface within the second or third lens unit (Gr2 or Gr3), and that the following condition (5) be fulfilled. Here, it is preferable that Conditions (1) to (3) noted above be fulfilled simultaneously.

$$|\phi Dp/\phi 2| < 0.10 \tag{5}$$

where $\phi Dp$ represents the diffractive optical power of the lens unit having a positive optical power (i.e. the second and third lens units (Gr2 and Gr3)); and $\phi 2$ represents the refractive optical power of the lens element having the diffractive optical element provided thereon and provided in the lens unit having a positive optical power (i.e. the second and third lens units (Gr2 and Gr3)).

Condition (5) defines the ratio of the total optical power of the diffractive optical element provided in the lens unit having a positive optical power to the total optical power of the single lens element having the diffractive optical element provided thereon. If the value of Condition (5) is greater than its upper limit, the diffractive power of the diffractive optical element is too strong, and thus chromatic aberration, as well as spherical aberration, is undercorrected.

In a three-unit zoom lens system of a negative-positive-positive (or negative-positive-negative) configuration, it is preferable that a diffractive optical element be provided at least on one surface within the lens unit having a negative optical power, and that the lens unit having a negative optical power include at least a negative lens element having a highly concave surface on the reduction side and a positive lens element having a highly convex surface on the enlargement side. In addition, it is preferable that the third lens unit (Gr3) be composed of at least one positive meniscus lens element having a convex surface on the reduction side, and that the following condition (6) be fulfilled. Here, it is preferable that Conditions (1) and (2) noted previously be fulfilled simultaneously.

$$0.3 < r2/r3 < 0.8 \tag{6}$$

where r2 represents the radius of curvature of the reduction-side surface of the first lens element counted from the enlargement side within the lens unit having a negative optical power; and r3 represents the radius of curvature of the enlargement-side surface of the second lens element counted from the enlargement side within the lens unit having a negative optical power.

Condition (6) defines the ratio of the radius of curvature of the reduction-side surface of the first lens element to the radius of curvature of the enlargement-side surface of the second lens element within the lens unit having a negative optical power (i.e., in the first to sixth embodiments, the first lens unit (Gr1)). If the value of Condition (6) is greater than its upper limit, the negative optical power due to refraction is too weak, and thus the diffractive optical element needs to be designed to contribute more to the negative optical power. This requires the pitch of the diffractive optical element be made finer and thus makes the manufacture of the diffractive optical element difficult. Moreover, the distances through which the individual lens units need to be moved during zooming become unduly long, and thus the zoom lens system as a whole becomes unduly large. In contrast, if the value of Condition (6) is less than its lower limit, it is difficult to correct coma aberration and distortion properly.

In a three-unit zoom lens system of a negative-positive-positive (or negative-positive-negative) configuration, it is preferable that a diffractive optical element be provided at least on one surface within the lens unit having a negative optical power, and that the lens unit having a negative optical power include at least a negative lens element having a highly concave surface on the reduction side and a positive lens element having a highly convex surface on the enlargement side. In addition, it is preferable that the third lens unit (Gr3) be composed of at least one positive meniscus lens element having a convex surface on the reduction side, and that the following condition (7) be fulfilled. Here, it is preferable that Conditions (1), (2) and (6) noted above be fulfilled simultaneously.

$$-0.5 < rL \times \phi p3 < -0.05 \tag{7}$$

where rL represents the radius of curvature of the reduction-side surface of the positive meniscus lens element disposed at the reduction-side end within the third lens unit (Gr3); and φp3 represents the composite optical power of the diffractive and refractive optical powers of the third lens unit (Gr3).

Condition (7) defines the radius of curvature of the reduction-side surface of the positive meniscus lens element disposed at the reduction-side end within the third lens unit (Gr3). If the value of Condition (7) is greater than its upper limit, spherical aberration is undercorrected. In contrast, if the value of Condition (7) is less than its lower limit, it is difficult to correct astigmatism properly.

EXAMPLES

Hereinafter, examples of the zoom lens systems embodying the present invention will be presented with reference to their construction data, graphic representations of aberrations, and other data. Tables 1 to 6 list the construction data of Examples 1 to 6, which respectively correspond to the first to sixth embodiments described above. FIGS. 1 to 6, which show the lens arrangement of the zoom lens systems of the first to sixth embodiments, respectively, illustrate the lens arrangement of Examples 1 to 6, respectively, in the longest-focal-length condition [T].

In the construction data of each embodiment, ri (i=1, 2, 3, . . . ) represents the radius of curvature of the ith surface counted from the enlargement side, di (i=1, 2, 3, . . . ) represents the ith axial distance counted from the enlargement side, and Ni (i=1, 2, 3, . . . ) and vi (i=1, 2, 3, . . . ) respectively represent the refractive index (Nd) for the d line and the Abbe number (vd) of the ith lens element counted from the enlargement side. Moreover, in the construction data, for each of the axial distances that vary with zooming (i.e. the variable axial distances), three values are given that are, from left, the axial aerial distance between the lens units in the shortest-focal-length condition [W], the same distance in the middle-focal-length condition [M], and the same distance in the longest-focal-length condition [T]. Also listed in the construction data are the focal lengths f and the F-numbers Fno of the entire zoom lens system in those three focal-length conditions [W], [M], and [T]. Moreover, Table 7 lists the values corresponding to conditions (1) to (7) as observed in each example. Note that, in each example, the zoom lens system is assumed to be typically set to magnifications of −1/6.05×, −1/4.28×, and −1/3.02× in the shortest-, middle-, and longest-focal-length condition, respectively.

A surface whose radius of curvature ri is marked with an asterisk (*) is an aspherical surface, whose surface shape is defined by Formula (AS) below. A surface ri marked with # is a surface having a diffractive optical element formed thereon (i.e. a diffractive surface), of which the phase shape of the pitch is defined by Formula (DS) below. Also listed together with the construction data are the aspherical surface data of each aspherical surface, the diffractive surface data of each diffractive surface, and other data.

$$Z = (C \cdot H^2)/(1 + \sqrt{1 - \epsilon \cdot C^2 \cdot H^2}) + (A1 \cdot H^4 + A2 \cdot H^6 + A3 \cdot H^8 + A4 \cdot H^{10}) \tag{AS}$$

where

Z represents the displacement from the reference surface along the optical axis at the height H;

H represents the height in a direction perpendicular to the optical axis;

C represents the paraxial curvature;

ε represents the quadric surface parameter (note that, in all examples presented below, ε=1);

A1 represents the aspherical coefficient of the fourth order;

A2 represents the aspherical coefficient of the sixth order;

A3 represents the aspherical coefficient of the eighth order; and

A4 represents the aspherical coefficient of the tenth order.

$$\Phi(H) = (2\pi/\lambda 0) \cdot (B1 \cdot H^2 + B2 \cdot H^4 + B3 \cdot H^6 + B4 \cdot H^8) \tag{DS}$$

where

Φ(H) represents the phase function of the diffractive surface;

H represents the height in a direction perpendicular to the optical axis;

B1 represents the phase function coefficient of the second order;

B2 represents the phase function coefficient of the fourth order;

B3 represents the phase function coefficient of the sixth order;

B4 represents the phase function coefficient of the eighth order; and

λ0 represents the design center wavelength (=587.56 nm, i.e. the wavelength of the d line).

Figure 7A:
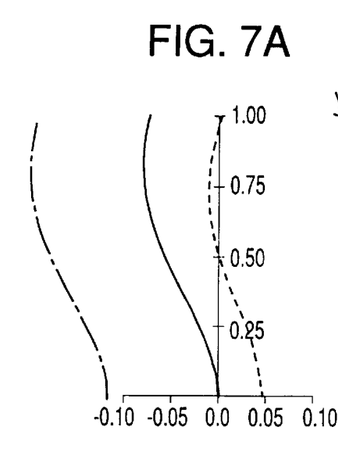
FIGS. 7A to 7C are diagrams showing the aberrations observed in the zoom lens system of Example 1, in the shortest-focal-length condition [W]
Figure 7B:
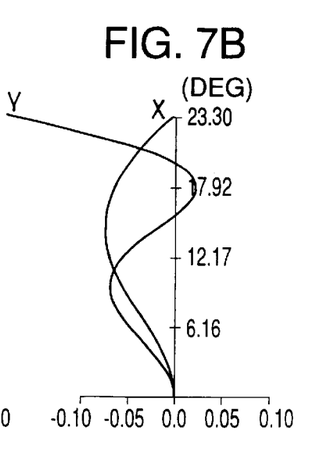
Figure 7C:
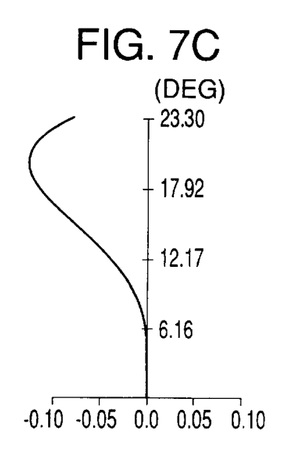
Figure 8A:
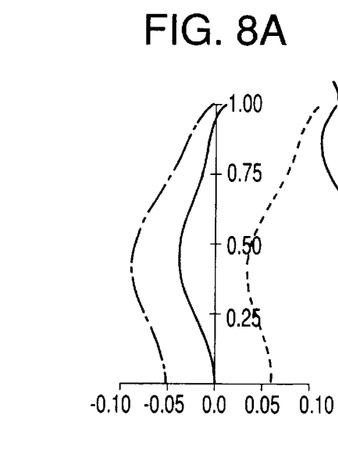
FIGS. 8A to 8C are diagrams showing the aberrations observed in the zoom lens system of Example 1, in the middle-focal-length condition [M]
Figure 8B:
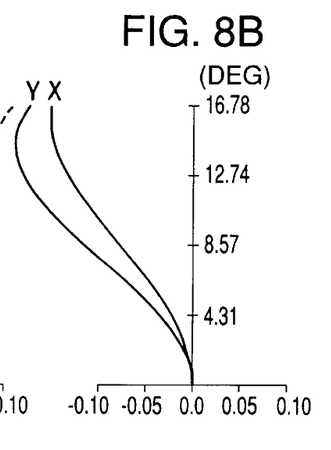
Figure 8C:
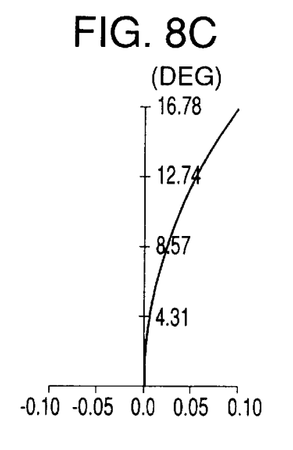
Figures 9A, 9B:
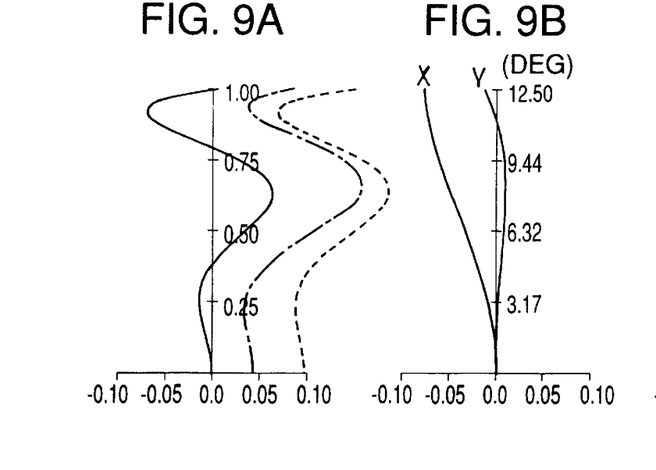
FIGS. 9A to 9C are diagrams showing the aberrations observed in the zoom lens system of Example 1, in the longest-focal-length condition [T]
Figure 9C:
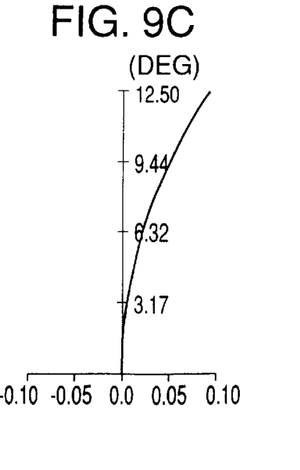
Figure 10A:
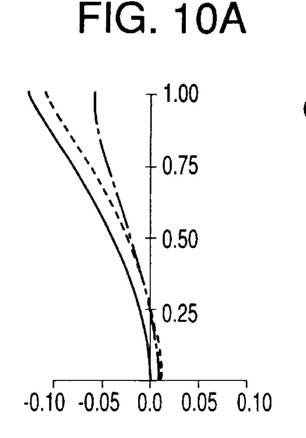
FIGS. 10A to 10C are diagrams showing the aberrations observed in the zoom lens system of Example 2, in the shortest-focal-length condition [W]
Figure 10B:
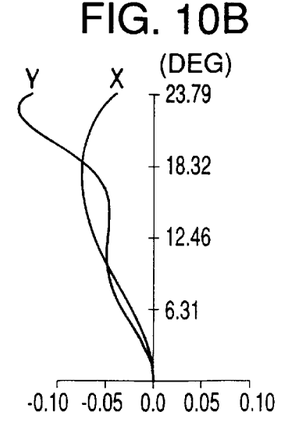
Figure 10C:
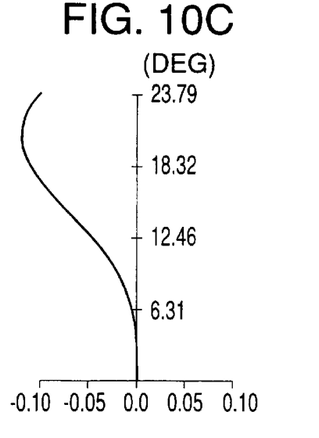
Figure 11A:
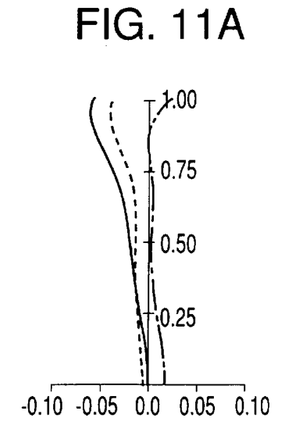
FIGS. 11A to 11C are diagrams showing the aberrations observed in the zoom lens system of Example 2, in the middle-focal-length condition [M]
Figure 11B:
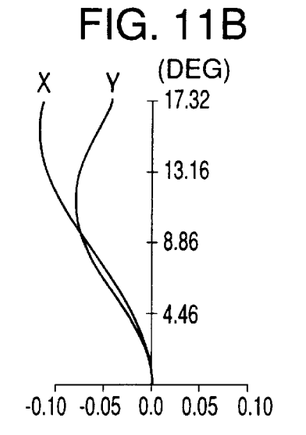
Figure 11C:
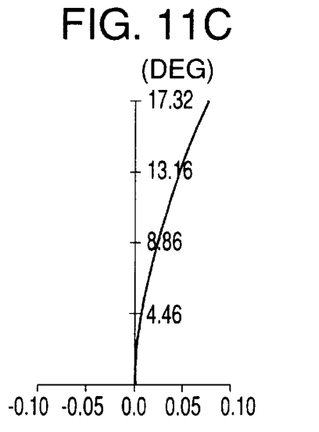
Figure 12A:
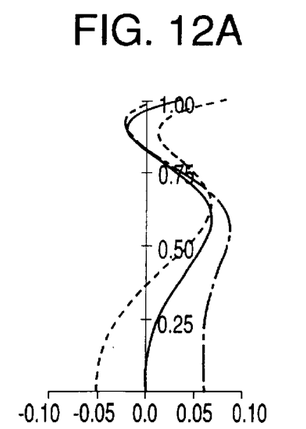
FIGS. 12A to 12C are diagrams showing the aberrations observed in the zoom lens system of Example 2, in the longest-focal-length condition [T]
Figures 12B, 12C:
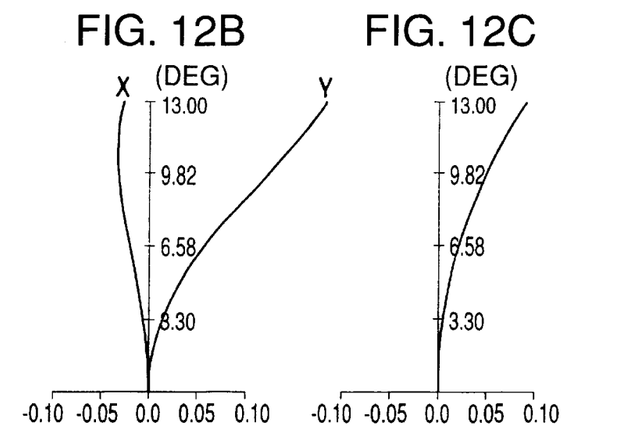
Figure 13A:
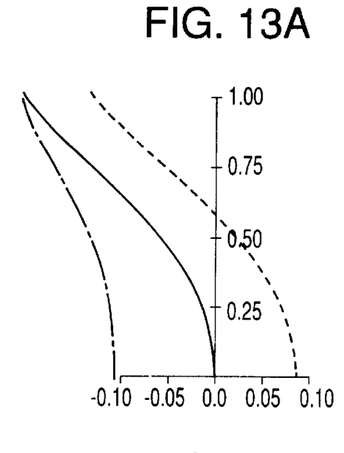
FIGS. 13A to 13C are diagrams showing the aberrations observed in the zoom lens system of Example 3, in the shortest-focal-length condition [W]
Figure 13B:
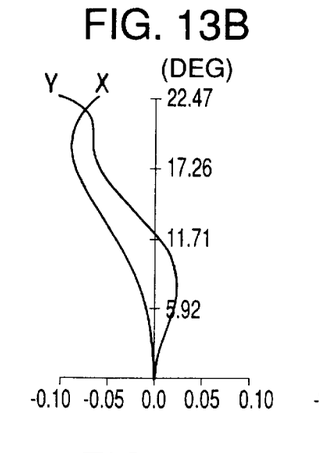
Figure 13C:
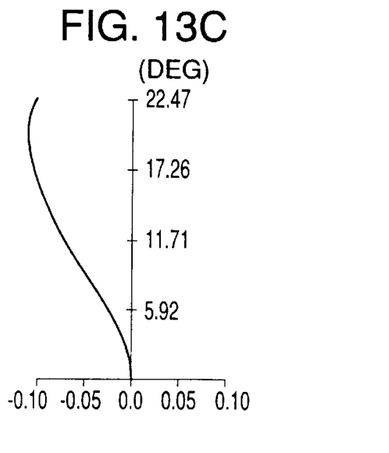
Figure 14A:
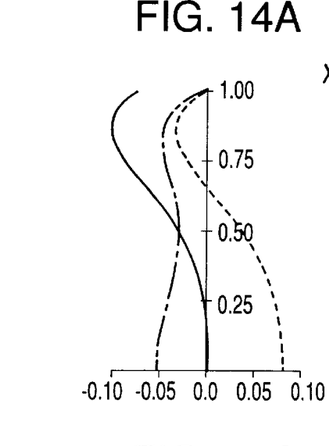
FIGS. 14A to 14C are diagrams showing the aberrations observed in the zoom lens system of Example 3, in the middle-focal-length condition [M]
Figure 14B:
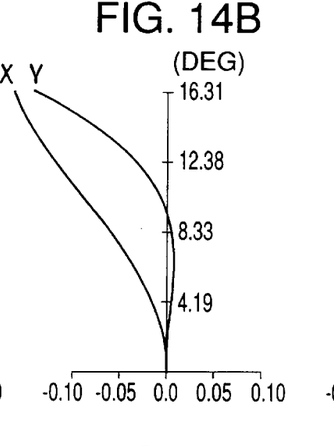
Figure 14C:
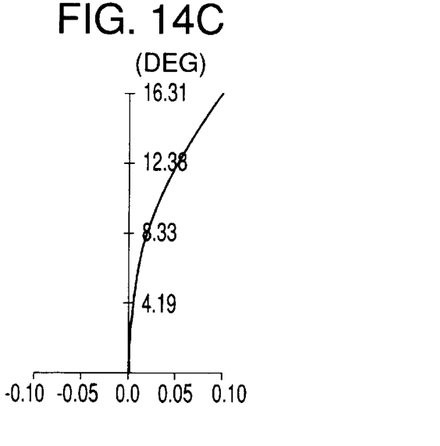
Figures 15A, 15B:
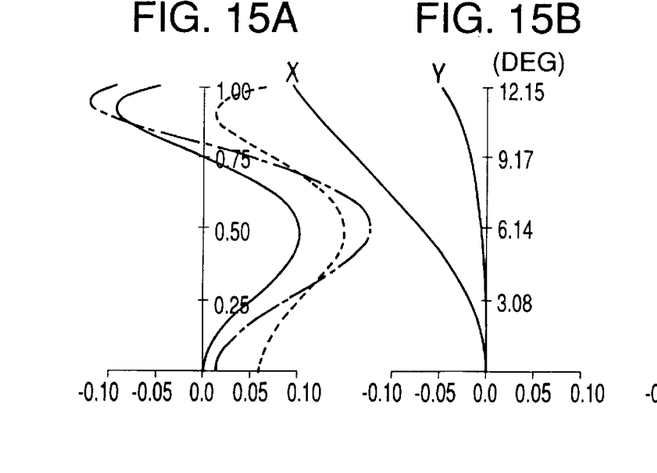
FIGS. 15A to 15C are diagrams showing the aberrations observed in the zoom lens system of Example 3, in the longest-focal-length condition [T]
Figure 15C:
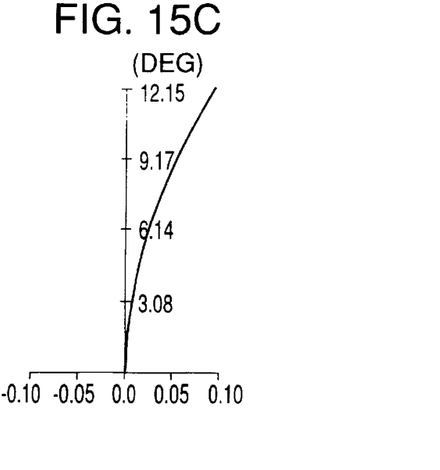
Figure 16A:
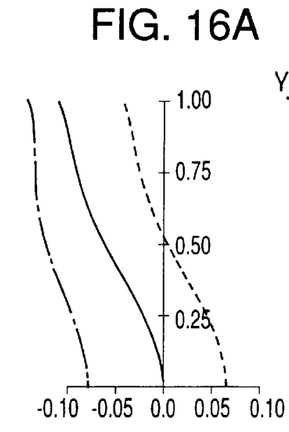
FIGS. 16A to 16C are diagrams showing the aberrations observed in the zoom lens system of Example 4, in the shortest-focal-length condition [W]
Figure 16B:
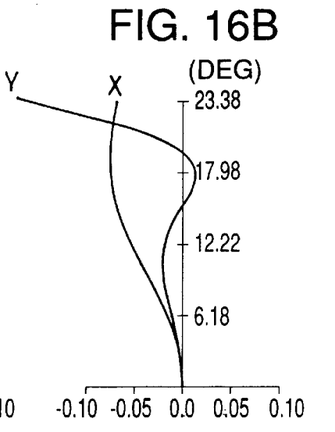
Figure 16C:
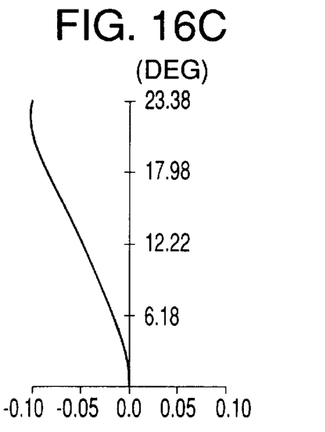
Figures 17A, 17B:
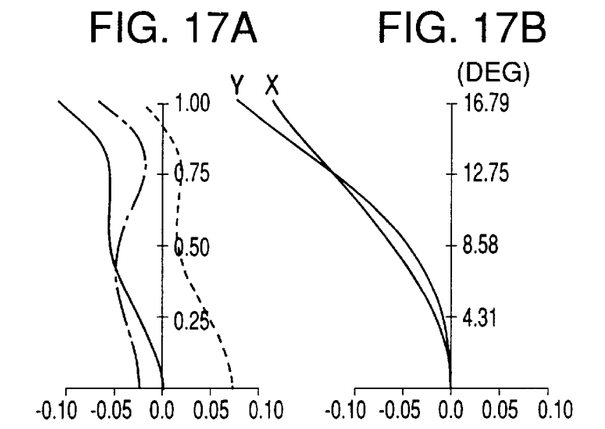
FIGS. 17A to 17C are diagrams showing the aberrations observed in the zoom lens system of Example 4, in the middle-focal-length condition [M]
Figure 17C:
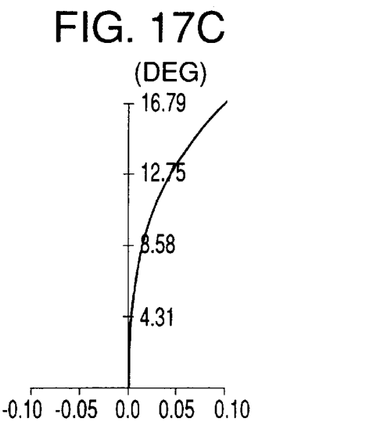
Figure 18A:
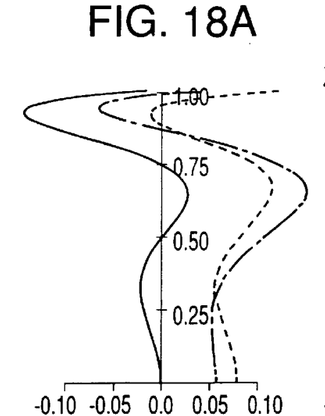
FIGS. 18A to 18C are diagrams showing the aberrations observed in the zoom lens system of Example 4, in the longest-focal-length condition [T]
Figure 18B:
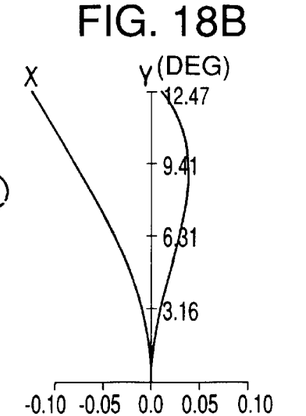
Figure 18C:
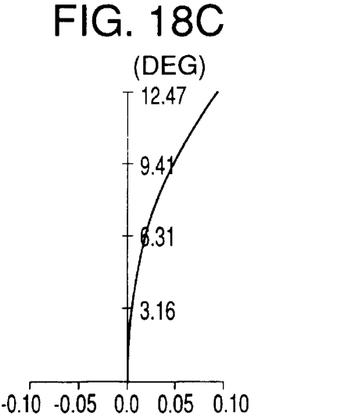
Figure 19A:
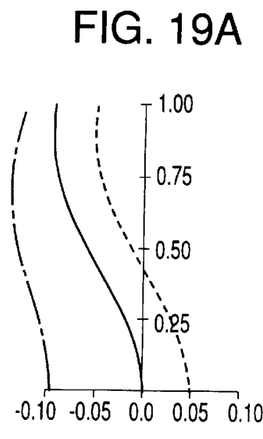
FIGS. 19A to 19C are diagrams showing the aberrations observed in the zoom lens system of Example 5, in the shortest-focal-length condition [W]
Figure 19B:
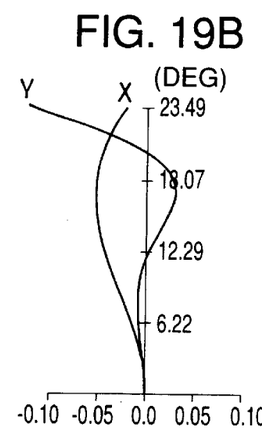
Figure 19C:
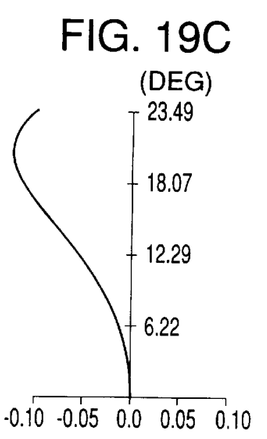
Figure 20A:
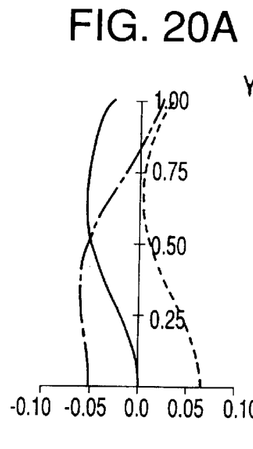
FIGS. 20A to 20C are diagrams showing the aberrations observed in the zoom lens system of Example 5, in the middle-focal-length condition [M]
Figure 20B:
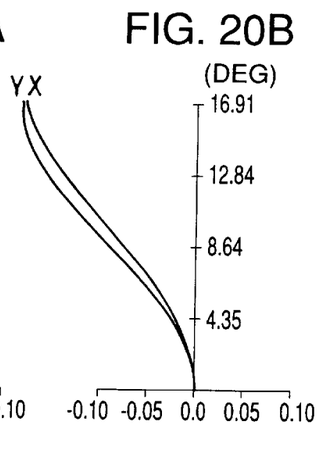
Figure 20C:
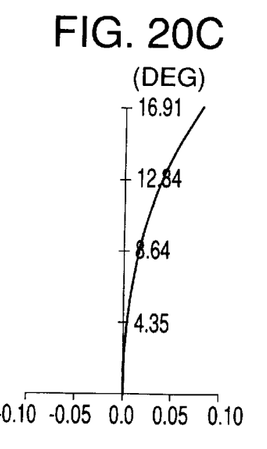
Figure 21A:
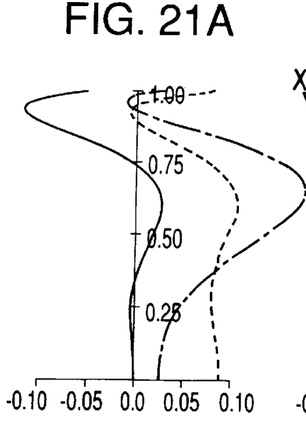
FIGS. 21A to 21C are diagrams showing the aberrations observed in the zoom lens system of Example 5, in the longest-focal-length condition [T]
Figure 21B:
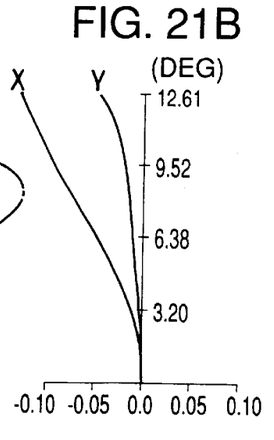
Figure 21C:
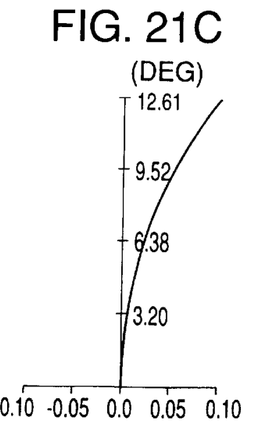
Figure 22A:
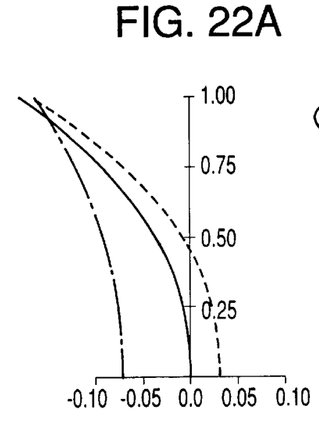
FIGS. 22A to 22C are diagrams showing the aberrations observed in the zoom lens system of Example 6, in the shortest-focal-length condition [W]
Figure 22B:
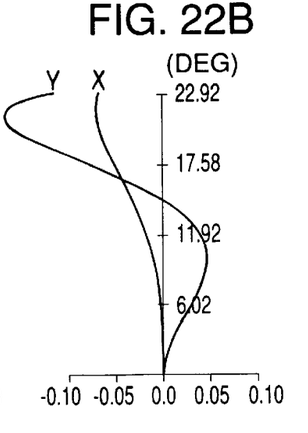
Figure 22C:
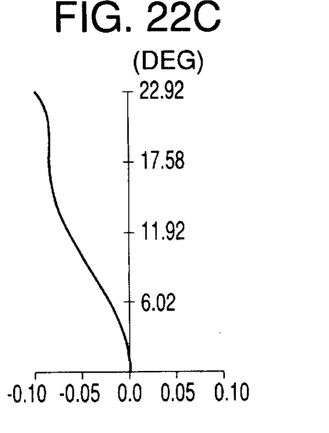
Figures 23A, 23B:
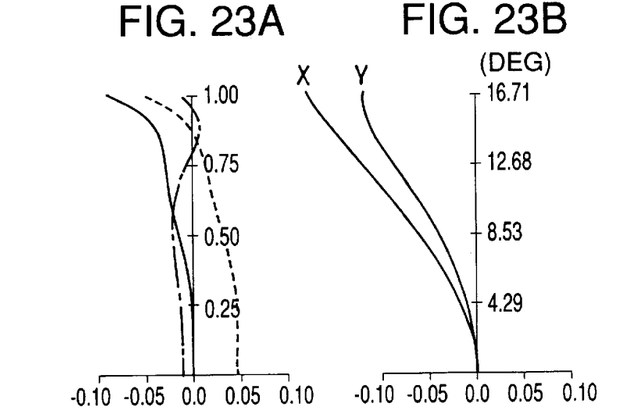
FIGS. 23A to 23C are diagrams showing the aberrations observed in the zoom lens system of Example 6, in the middle-focal-length condition [M]
Figure 23C:
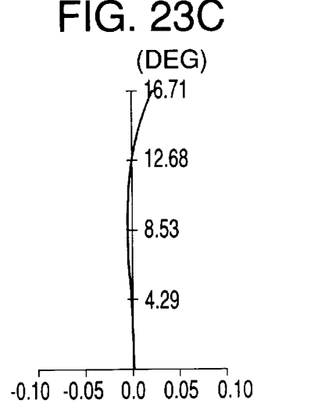
Figure 24A:
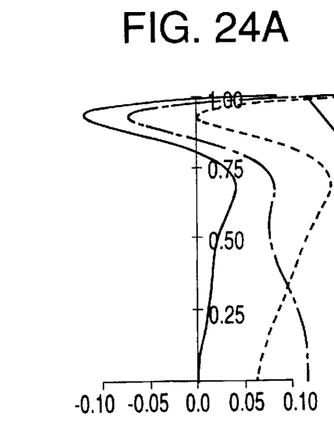
FIGS. 24A to 24C are diagrams showing the aberrations observed in the zoom lens system of Example 6, in the longest-focal-length condition [T]
Figure 24B:
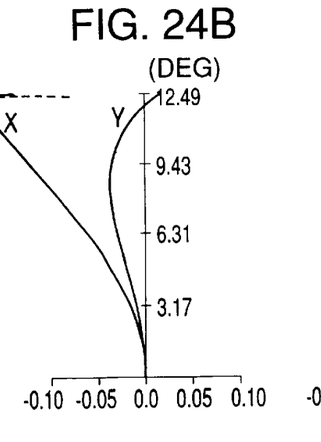
Figure 24C:
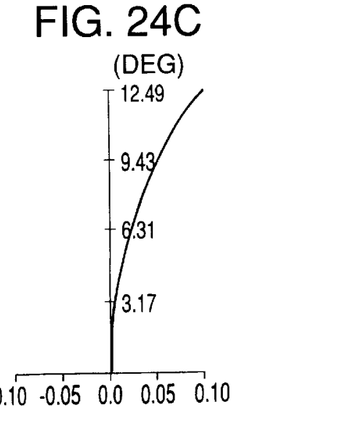

FIGS. 7A to 7C, 8A to 8C, and 9A to 9C are graphic representations of the aberrations observed in the zoom lens system of Example 1; FIGS. 10A to 10C, 11A to 11C, and 12A to 12C are graphic representations of the aberrations observed in the zoom lens system of Example 2; FIGS. 13A to 13C, 14A to 14C, and 15A to 15C are graphic representations of the aberrations observed in the zoom lens system of Example 3; FIGS. 16A to 16C, 17A to 17C, and 18A to 18C are graphic representations of the aberrations observed in the zoom lens system of Example 4; FIGS. 19A to 19C, 20A to 20C, and 21A to 21C are graphic representations of the aberrations observed in the zoom lens system of Example 5; and FIGS. 22A to 22C, 23A to 23C, and 24A to 24C are graphic representations of the aberrations observed in the zoom lens system of Example 6. Of these diagrams, FIGS. 7A to 7C, 10A to 10C, 13A to 13C, 16A to 16C, 19A to 19C, and 22A to 22C show the aberrations observed in the shortest-focal-length condition [W]; FIGS. 8A to 8C, 11A to 11C, 14A to 14C, 17A to 17C, 20A to 20C, and 23A to 23C show the aberrations observed in the middle-focal-length condition [M]; and FIGS. 9A to 9C, 12A to 12C, 15A to 15C, 18A to 18C, 21A to 21C, and 24A to 24C show the aberrations observed in the longest-focal-length condition [T]. Furthermore, of these diagrams, FIGS. 7A to 24A show spherical aberration; FIGS. 7B to 24B show astigmatism; and FIGS. 7C to 24C show distortion. In the spherical aberration diagrams, the broken line represents the aberration for the C line (wavelength λC: 656.3 nm), the solid line represents the aberration for the d line (wavelength λd: 587.6 nm), and the dash-and-dot line represents the aberration for the g line (wavelength λg: 435.8 nm). For spherical aberration (taken along the horizontal axis and given as the deviation (mm) from the paraxial image plane along the optical axis), the value obtained by normalizing the height of incidence (H) with respect to the maximum height (H0) (i.e. the relative height at which the optical axis crosses the entrance-pupil plane: H/H0) is taken along the vertical axis. For astigmatism (taken along the horizontal axis and given as the deviation (mm) from the paraxial image plane along the optical axis) and distortion (taken along the horizontal axis and given in %), the half angle of view (°) is taken along the vertical axis. In the astigmatism diagrams, the solid line X represents the astigmatism on the sagittal plane, and the solid line Y represents the astigmatism on the meridional plane.

TABLE 1

<<Construction Data of Example 1>> f = 53.0~71.6~90.0
Fno = 5.75~5.43~5.02

| Radius of Curvature | Axial Distance | Refractive Index | Abbe Number |
|---|---|---|---|
| {First Lens Unit (Gr1) . . . Negative} | | | |
| r1 = 240.33 | | | |
| | d1 = 2.50 | N1 = 1.4870 | ν1 = 70.4 |
| r2* = 29.86 | | | |
| | d2 = 18.82 | | |
| r3*# = 81.83 | | | |
| | d3 = 6.57 | N2 = 1.6755 | ν2 = 51.5 |
| r4 = 200.01 | | | |
| | d4 = 60.61~22.62~0.35 | | |
| {Second Lens Unit (Gr2) . . . Positive} | | | |
| r5 = ∞ {Aperture Stop (S)} | | | |
| | d5 = 0.00 | | |
| r6*# = 21.67 | | | |
| | d6 = 7.00 | N3 = 1.6147 | ν3 = 49.5 |
| r7 = −381.27 | | | |
| | d7 = 1.74 | | |
| r8 = 95.66 | | | |
| | d8 = 3.19 | N4 = 1.7550 | ν4 = 27.6 |
| r9* = 23.98 | | | |
| | d9 = 2.58~4.70~6.48 | | |
| {Third Lens Unit (Gr3) . . . Positive} | | | |
| r10* = −26.77 | | | |
| | d10 = 7.00 | N5 = 1.4870 | ν5 = 70.4 |
| r11* = −22.43 | | | |

[Aspherical Surface Data of Second Surface (r2)]
A1 = −0.13359 × 10⁻⁵
A2 = −0.12766 × 10⁻⁹
A3 = −0.19296 × 10⁻¹¹
A4 = −0.25547 × 10⁻¹⁴
[Aspherical Surface Data of Third Surface (r3)]
A1 = 0.10356 × 10⁻⁵
A2 = 0.86442 × 10⁻⁹
[Aspherical Surface Data of Sixth Surface (r6)]
A1 = −0.59696 × 10⁻⁶
A2 = −0.49461 × 10⁻⁸
A3 = −0.28552 × 10⁻¹⁰
[Aspherical Surface Data of Ninth Surface (r9)]
A1 = 0.17603 × 10⁻⁴
A2 = 0.44794 × 10⁻⁷
A3 = −0.11964 × 10⁻⁹
A4 = 0.55552 × 10⁻¹²
[Aspherical Surface Data of Tenth Surface (r10)]
A1 = −0.49193 × 10⁻⁵
A2 = −0.43328 × 10⁻⁷

TABLE 1-continued

<<Construction Data of Example 1>>

A3 = −0.19739 × 10⁻⁹
A4 = −0.42486 × 10⁻¹²
[Aspherical Surface Data of Eleventh Surface (r11)]
A1 = 0.17906 × 10⁻⁶
A2 = −0.15165 × 10⁻⁷
A3 = −0.11528 × 10⁻⁹
A4 = 0.38339 × 10⁻¹²
[Diffractive Surface Data of Third Surface (r3)]
B1 = 6.6010 × 10⁻⁵
B2 = −9.0280 × 10⁻⁸
B3 = 9.9452 × 10⁻¹¹
[Diffractive Surface Data of Sixth Surface (r6)]
B1 = −1.2688 × 10⁻⁴
B2 = 1.8458 × 10⁻⁷
B3 = −5.8796 × 10⁻¹⁰
B4 = −3.5241 × 10⁻¹³

TABLE 2

<<Construction Data of Example 2>> f = 52.2~70.5~88.8
Fno = 5.81~5.53~5.16

| Radius of Curvature | Axial Distance | Refractive Index | Abbe Number |
|---|---|---|---|
| {First Lens Unit (Gr1) . . . Negative} | | | |
| r1# = 188.30 | | | |
| | d1 = 2.50 | N1 = 1.6200 | ν1 = 60.3 |
| r2* = 30.95 | | | |
| | d2 = 18.28 | | |
| r3* = 54.10 | | | |
| | d3 = 3.15 | N2 = 1.6497 | ν2 = 33.6 |
| r4 = 100.02 | | | |
| | d4 = 61.61~27.84~7.39 | | |
| {Second Lens Unit (Gr2) . . . Positive} | | | |
| r5 = ∞ {Aperture Stop (S)} | | | |
| | d5 = 0.00 | | |
| r6* = 21.93 | | | |
| | d6 = 6.20 | N3 = 1.5907 | ν3 = 58.9 |
| r7 = −313.39 | | | |
| | d7 = 2.20 | | |
| r8 = 87.50 | | | |
| | d8 = 3.12 | N4 = 1.7491 | ν4 = 34.6 |
| r9* = 24.92 | | | |
| | d9 = 4.69~8.43~11.07 | | |
| {Third Lens Unit (Gr3) . . . Positive} | | | |
| r10* = −25.96 | | | |
| | d10 = 3.42 | N5 = 1.7479 | ν5 = 31.9 |
| r11* = −36.31 | | | |
| | d11 = 1.02 | | |
| r12 = −50.13 | | | |
| | d12 = 3.81 | N6 = 1.5704 | ν6 = 63.2 |
| r13*# = −26.01 | | | |

[Aspherical Surface Data of Second Surface (r2)]
A1 = −0.25738 × 10⁻⁵
A2 = −0.40918 × 10⁻⁹
A3 = −0.57691 × 10⁻¹¹
A4 = 0.27173 × 10⁻¹⁴
[Aspherical Surface Data of Third Surface (r3)]
A1 = 0.54933 × 10⁻⁸
A2 = 0.72382 × 10⁻⁹
A3 = −0.34693 × 10⁻¹¹
A4 = 0.45034 × 10⁻¹⁴
[Aspherical Surface Data of Sixth Surface (r6)]
A1 = −0.75015 × 10⁻⁶
A2 = −0.31758 × 10⁻⁸
A3 = −0.21935 × 10⁻¹⁰
A4 = −0.31253 × 10⁻¹³
[Aspherical Surface Data of Ninth Surface (r9)]
A1 = 0.15250 × 10⁻⁴
A2 = 0.45780 × 10⁻⁷
A3 = −0.50688 × 10⁻¹⁰
A4 = 0.20570 × 10⁻¹²

TABLE 2-continued

<<Construction Data of Example 2>>

[Aspherical Surface Data of Tenth Surface (r10)]
A1 = −0.19975 × $10^{−6}$
A2 = 0.32710 × $10^{−7}$
A3 = −0.34527 × $10^{−9}$
A4 = 0.34692 × $10^{−12}$
[Aspherical Surface Data of Eleventh Surface (r11)]
A1 = 0.15186 × $10^{−5}$
A2 = 0.26729 × $10^{−7}$
A3 = −0.19751 × $10^{−9}$
A4 = 0.39507 × $10^{−12}$
[Aspherical Surface Data of Thirteenth Surface (r13)]
A1 = 0.76389 × $10^{−6}$
A2 = −0.37449 × $10^{−8}$
[Diffractive Surface Data of First Surface (r1)]
B1 = −5.1493 × $10^{−6}$
B2 = 4.2511 × $10^{−8}$
B3 = −2.8183 × $10^{−11}$
[Diffractive Surface Data of Thirteenth Surface (r13)]
B1 = −1.3992 × $10^{−4}$
B2 = 1.6053 × $10^{−7}$
B3 = −1.1060 × $10^{−9}$

TABLE 3

<<Construction Data of Example 3>>
f = 54.3~72.4~90.5
Fno = 4.95~4.66~4.28

| Radius of Curvature | Axial Distance | Refractive Index | Abbe Number |
|---|---|---|---|
| {First Lens Unit (Gr1) . . . Negative} | | | |
| r1* = 138.89 | | | |
| | d1 = 2.50 | N1 = 1.6200 | ν1 = 60.3 |
| r2*# = 32.05 | | | |
| | d2 = 16.03 | | |
| r3* = 40.63 | | | |
| | d3 = 2.94 | N2 = 1.7225 | ν2 = 29.6 |
| r4 = 53.09 | | | |
| | d4 = 48.29~18.51~0.33 | | |
| {Second Lens Unit (Gr2) . . . Positive} | | | |
| r5 = 29.70 | | | |
| | d5 = 6.83 | N3 = 1.5168 | ν3 = 67.4 |
| r6 = −1503.16 | | | |
| | d6 = 5.36 | | |
| r7* = 34.28 | | | |
| | d7 = 7.00 | N4 = 1.6620 | ν4 = 53.2 |
| r8 = 83.45 | | | |
| | d8 = 1.12 | | |
| r9 = ∞ {Aperture Stop (S)} | | | |
| | d9 = 0.10 | | |
| r10 = −2107.70 | | | |
| | d10 = 2.50 | N5 = 1.7003 | ν5 = 30.2 |
| r11* = 22.06 | | | |
| | d11 = 7.60 | | |
| r12 = 278.29 | | | |
| | d12 = 2.50 | N6 = 1.7440 | ν6 = 44.7 |
| r13 = −159.37 | | | |
| | d13 = 0.24~1.33~1.91 | | |
| {Third Lens Unit (Gr3) . . . Positive} | | | |
| r14*# = −80.52 | | | |
| | d14 = 7.00 | N7 = 1.7218 | ν7 = 46.6 |
| r15 = −44.21 | | | |

[Aspherical Surface Data of First Surface (r1)]
A1 = 0.12653 × $10^{−6}$
A2 = −0.12009 × $10^{−9}$
A3 = 0.22074 × $10^{−12}$
A4 = 0.19142 × $10^{−15}$
[Aspherical Surface Data of Second Surface (r2)]
A1 = −0.13513 × $10^{−5}$
A2 = −0.15996 × $10^{−8}$
[Aspherical Surface Data of Third Surface (r3)]
A1 = −0.30025 × $10^{−6}$
A2 = 0.28603 × $10^{−9}$
A3 = −0.78654 × $10^{−12}$
A4 = 0.69422 × $10^{−15}$

TABLE 3-continued

<<Construction Data of Example 3>>

[Aspherical Surface Data of Seventh Surface (r7)]
A1 = −0.44607 × $10^{−5}$
A2 = −0.10445 × $10^{−7}$
A3 = −0.14964 × $10^{−10}$
A4 = 0.11674 × $10^{−13}$
[Aspherical Surface Data of Eleventh Surface (r11)]
A1 = 0.16154 × $10^{−5}$
A2 = −0.92014 × $10^{−8}$
A3 = 0.42180 × $10^{−10}$
A4 = 0.10828 × $10^{−12}$
[Aspherical Surface Data of Fourteenth Surface (r14)]
A1 = 0.27941 × $10^{−5}$
A2 = 0.13440 × $10^{−7}$
[Diffractive Surface Data of Second Surface (r2)]
B1 = 7.4037 × $10^{−6}$
B2 = −6.5046 × $10^{−8}$
B3 = 1.7972 × $10^{−10}$
B4 = −2.5108 × $10^{−13}$
[Diffractive Surface Data of Fourteenth Surface (r14)]
B1 = −1.1409 × $10^{−4}$
B2 = −1.4185 × $10^{−7}$
B3 = 3.7727 × $10^{−9}$
B4 = −1.8750 × $10^{−11}$

TABLE 4

<<Construction Data of Example 4>>
f = 52.6~71.3~89.8
Fno = 5.74~5.41~5.00

| Radius of Curvature | Axial Distance | Refractive Index | Abbe Number |
|---|---|---|---|
| {First Lens Unit (Gr1) . . . Negative} | | | |
| r1* = 892.10 | | | |
| | d1 = 2.50 | N1 = 1.4870 | ν1 = 70.4 |
| r2*# = 33.83 | | | |
| | d2 = 23.50 | | |
| r3 = 58.65 | | | |
| | d3 = 2.50 | N2 = 1.7457 | ν2 = 40.8 |
| r4 = 84.91 | | | |
| | d4 = 59.48~22.06~0.10 | | |
| {Second Lens Unit (Gr2) . . . Positive} | | | |
| r5* = 23.39 | | | |
| | d5 = 7.00 | N3 = 1.5345 | ν3 = 64.7 |
| r6 = −208.23 | | | |
| | d6 = 3.06 | | |
| r7 = ∞ {Aperture Stop (S)} | | | |
| | d7 = 0.10 | | |
| r8 = 55.03 | | | |
| | d8 = 3.04 | N4 = 1.7537 | ν4 = 28.9 |
| r9* = 24.79 | | | |
| | d9 = 2.02~4.60~6.60 | | |
| {Third Lens Unit (Gr3) . . . Positive} | | | |
| r10*# = −22.06 | | | |
| | d10 = 6.80 | N5 = 1.4870 | ν5 = 70.4 |
| r11* = −20.61 | | | |

[Aspherical Surface Data of First Surface (r1)]
A1 = 0.17638 × $10^{−5}$
A2 = −0.32689 × $10^{−8}$
A3 = 0.31282 × $10^{−11}$
A4 = −0.12245 × $10^{−14}$
[Aspherical Surface Data of Second Surface (r2)]
A1 = −0.15723 × $10^{−6}$
A2 = −0.35930 × $10^{−8}$
[Aspherical Surface Data of Fifth Surface (r5)]
A1 = −0.26879 × $10^{−5}$
A2 = −0.10281 × $10^{−7}$
A3 = 0.74280 × $10^{−11}$
A4 = −0.83045 × $10^{−13}$
[Aspherical Surface Data of Ninth Surface (r9)]
A1 = 0.10546 × $10^{−4}$
A2 = 0.76799 × $10^{−8}$
A3 = 0.92557 × $10^{−10}$
A4 = −0.59229 × $10^{−12}$

TABLE 4-continued

<<Construction Data of Example 4>>

[Aspherical Surface Data of Tenth Surface (r10)]
A1 = −0.65378 × $10^{-6}$
A2 = −0.29145 × $10^{-7}$
[Aspherical Surface Data of Eleventh Surface (r11)]
A1 = 0.39938 × $10^{-5}$
A2 = 0.19933 × $10^{-9}$
A3 = −0.67106 × $10^{-10}$
A4 = 0.55502 × $10^{-12}$
[Diffractive Surface Data of Second Surface (r2)]
B1 = 4.1737 × $10^{-5}$
[Diffractive Surface Data of Tenth Surface (r10)]
B1 = −1.3666 × $10^{-4}$

TABLE 5

<<Construction Data of Example 5>> f = 52.7~71.5~90.0
Fno = 5.78~5.47~5.07

| Radius of Curvature | Axial Distance | Refractive Index | Abbe Number |
|---|---|---|---|
| {First Lens Unit (Gr1) . . . Negative} | | | |
| r1 = 182.67 | | | |
| | d1 = 2.50 | N1 = 1.4870 | ν1 = 70.4 |
| r2* = 30.07 | | | |
| | d2 = 22.38 | | |
| r3*# = 84.32 | | | |
| | d3 = 2.91 | N2 = 1.6303 | ν2 = 45.4 |
| r4 = 182.41 | | | |
| | d4 = 61.45~22.87~0.40 | | |
| {Second Lens unit (Gr2) . . . Positive} | | | |
| r5 = ∞ {Aperture Stop (S)} | | | |
| | d5 = 0.00 | | |
| r6* = 21.60 | | | |
| | d6 = 7.00 | N3 = 1.5880 | ν3 = 51.6 |
| r7 = −226.95 | | | |
| | d7 = 1.58 | | |
| r8 = 77.00 | | | |
| | d8 = 2.50 | N4 = 1.7550 | ν4 = 27.6 |
| r9* = 24.04 | | | |
| | d9 = 2.68~5.71~8.52 | | |
| {Third Lens unit (Gr3) . . . Positive} | | | |
| r10*# = −22.34 | | | |
| | d10 = 7.00 | N5 = 1.4870 | ν5 = 70.4 |
| r11* = −20.78 | | | |

[Aspherical Surface Data of Second Surface (r2)]
A1 = −0.15026 × $10^{-5}$
A2 = −0.91056 × $10^{-9}$
A3 = −0.61180 × $10^{-12}$
A4 = −0.30338 × $10^{-14}$
[Aspherical Surface Data of Third Surface (r3)]
A1 = 0.88997 × $10^{-6}$
A2 = 0.80680 × $10^{-9}$
[Aspherical Surface Data of Sixth Surface (r6)]
A1 = −0.10376 × $10^{-5}$
A2 = −0.85506 × $10^{-8}$
A3 = −0.49843 × $10^{-11}$
A4 = −0.10792 × $10^{-12}$
[Aspherical Surface Data of Ninth Surface (r9)]
A1 = 0.15490 × $10^{-4}$
A2 = 0.24855 × $10^{-7}$
A3 = 0.12022 × $10^{-9}$
A4 = −0.39965 × $10^{-12}$
[Aspherical Surface Data of Tenth Surface (r10)]
A1 = −0.20973 × $10^{-5}$
A2 = −0.21920 × $10^{-7}$
[Aspherical Surface Data of Eleventh Surface (r11)]
A1 = 0.34325 × $10^{-5}$
A2 = 0.45686 × $10^{-8}$
A3 = −0.61717 × $10^{-10}$
A4 = 0.43116 × $10^{-12}$
[Diffractive Surface Data of Third Surface (r3)]
B1 = 5.0649 × $10^{-5}$
B2 = −5.3271 × $10^{-8}$

TABLE 5-continued

<<Construction Data of Example 5>>

B3 = 2.3195 × $10^{-11}$
[Diffractive Surface Data of Tenth Surface (r10)]
B1 = −1.7812 × $10^{-4}$

TABLE 6

<<Construction Data of Example 6>> f = 53.7~71.1~88.7
Fno = 5.69~5.36~4.94

| Radius of Curvature | Axial Distance | Refractive Index | Abbe Number |
|---|---|---|---|
| {First Lens Unit (Gr1) . . . Negative} | | | |
| r1* = −223.21 | | | |
| | d1 = 2.50 | N1 = 1.6389 | ν1 = 46.8 |
| r2* = 38.61 | | | |
| | d2 = 17.77 | | |
| r3# = 76.70 | | | |
| | d3 = 2.50 | N2 = 1.7550 | ν2 = 27.6 |
| r4 = 182.54 | | | |
| | d4 = 43.62~20.27~6.21 | | |
| {Second Lens Unit (Gr2) . . . Positive} | | | |
| r5*# = 24.09 | | | |
| | d5 = 6.19 | N3 = 1.5022 | ν3 = 68.8 |
| r6* = −579.95 | | | |
| | d6 = 9.60 | | |
| r7 = ∞ {Aperture Stop (S)} | | | |
| | d7 = 0.10 | | |
| r8* = 121.29 | | | |
| | d8 = 2.50 | N4 = 1.6200 | ν4 = 60.3 |
| r9 = −351.01 | | | |
| | d9 = 1.88 | | |
| {Third Lens Unit (Gr3) . . . Positive} | | | |
| r10* = −47.66 | | | |
| | d10 = 2.50 | N5 = 1.6931 | ν5 = 30.6 |
| r11 = 75.52 | | | |
| | d11 = 3.84~2.22~1.25 | | |
| r12 = −130.42 | | | |
| | d12 = 7.00 | N6 = 1.7440 | ν6 = 44.7 |
| r13* = −52.12 | | | |

[Aspherical Surface Data of First Surface (r1)]
A1 = 0.14808 × $10^{-5}$
A2 = −0.13578 × $10^{-8}$
A3 = −0.97559 × $10^{-12}$
A4 = −0.38796 × $10^{-15}$
[Aspherical Surface Data of Second Surface (r2)]
A1 = −0.12028 × $10^{-5}$
A2 = −0.11555 × $10^{-8}$
A3 = −0.24466 × $10^{-11}$
A4 = −0.59662 × $10^{-14}$
[Aspherical Surface Data of Fifth Surface (r5)]
A1 = 0.17699 × $10^{-6}$
A2 = 0.22510 × $10^{-8}$
[Aspherical Surface Data of Sixth Surface (r6)]
A1 = 0.50370 × $10^{-5}$
A2 = −0.55928 × $10^{-11}$
A3 = −0.14218 × $10^{-10}$
A4 = 0.23963 × $10^{-13}$
[Aspherical Surface Data of Eighth Surface (r8)]
A1 = −0.19588 × $10^{-5}$
A2 = −0.13687 × $10^{-8}$
A3 = −0.73932 × $10^{-10}$
A4 = 0.16585 × $10^{-11}$
[Aspherical Surface Data of Tenth Surface (r10)]
A1 = 0.51720 × $10^{-5}$
A2 = −0.24589 × $10^{-9}$
A3 = −0.10532 × $10^{-9}$
A4 = −0.13970 × $10^{-11}$
[Aspherical Surface Data of Thirteenth Surface (r13)]
A1 = 0.93675 × $10^{-5}$
A2 = 0.21325 × $10^{-7}$
A3 = −0.63025 × $10^{-10}$
A4 = 0.24720 × $10^{-12}$ TABLE 6-continued <<Construction Data of Example 6>>

[Diffractive Surface Data of Third Surface (r3)]
B1 = 7.6335 × 10$^{-5}$
B2 = 1.6519 × 10$^{-7}$
B3 = −5.9487 × 10$^{-10}$
B4 = 8.3781 × 10$^{-13}$
[Diffractive Surface Data of Fifth Surface (r5)]
B1 = −1.2860 × 10$^{-4}$
B2 = −1.0695 × 10$^{-8}$
B3 = −4.7484 × 10$^{-10}$
B4 = 2.1844 × 10$^{-12}$

TABLE 7

<<Values Corresponding to Conditions (1) to (7)>>

| Example | (1) $\|\phi Dn/\phi 1\|$ | (2) $\phi n/\phi W$ | (3) $\phi n/\phi p$ | (4) $\|\phi Dp/\phi p\|$ | (5) $\|\phi Dp/\phi 2\|$ | (6) r2/r3 | (7) rL · $\phi$p3 |
|---|---|---|---|---|---|---|---|
| 1 | 0.0265 | −0.439 | −0.458 | 0.0200 | 0.0085 | 0.365 | −0.121 |
| 2 | 0.0006 | −0.495 | −0.523 | 0.0509 | 0.0250 | 0.572 | −0.143 |
| 3 | 0.0010 | −0.515 | −0.456 | 0.0279 | 0.0286 | 0.789 | −0.361 |
| 4 | 0.0060 | −0.456 | −0.492 | 0.0653 | 0.0695 | 0.577 | −0.086 |
| 5 | 0.0248 | −0.443 | −0.479 | 0.0817 | 0.0881 | 0.357 | −0.091 |
| 6 | 0.0266 | −0.645 | −0.564 | 0.0207 | 0.0119 | 0.503 | −0.464 |

What is claimed is:

1. A zoom lens system comprising, from an enlargement side:

a first lens unit having a negative optical power and having a lens element including a diffractive optical surface;

a second lens unit having a positive optical power; and a third lens unit, wherein a zooming operation is performed by varying distances among the first through third lens units, wherein the zoom lens system fulfills the following conditions:

$$|\phi Dn/\phi 1|<0.06$$

$$-0.8<\phi n/\phi W<-0.3$$

where

φDn represents a diffractive optical power of the first lens unit;

φ1 represents a refractive optical power of the lens element including the diffractive optical surface;

φn represents a composite optical power of diffractive and refractive optical powers of the first lens unit; and φW represents a composite optical power of diffractive and refractive optical powers of the entire lens system in a shortest-focal-length condition.

2. A zoom lens system as claimed in claim 1, wherein the third lens unit has a positive optical power.

3. A zoom lens system as claimed in claim 1, wherein the third lens unit has a positive optical power and has a lens element including a diffractive optical surface.

4. A zoom lens system as claimed in claim 1, wherein the third lens unit has a positive optical power, and wherein the second lens unit has a lens element including a diffractive optical surface.

5. A zoom lens system as claimed in claim 1, wherein the second lens unit has a lens element including a diffractive optical surface, and wherein the zoom lens system fulfills the following condition:

$$-1.0<\phi n/\phi p<-0.4$$

where

φn represents a composite optical power of diffractive and refractive optical powers of the first lens unit; and φp represents a composite optical power of diffractive and refractive optical powers of the second lens unit.

6. A zoom lens system as claimed in claim 1, wherein the second lens unit has a lens element including a diffractive optical surface, and wherein the zoom lens system fulfills the following condition:

$$0.01<|\phi Dp/\phi p|<0.10$$

where

φDp represents a diffractive optical power of the second lens unit; and

φp represents a composite optical power of diffractive and refractive optical powers of the second lens unit.

7. A zoom lens system as claimed in claim 1, wherein the second lens unit has a lens element including a diffractive optical surface, and wherein the zoom lens system fulfills the following condition:

$$|\phi Dp/\phi 2|<0.06$$

where

φDp represents a diffractive optical power of the second lens unit; and

φ2 represents a refractive optical power of the lens element including the diffractive optical surface of the second lens unit.

8. A zoom lens system comprising, from an enlargement side:

a first lens unit having a negative optical power;

a second lens unit having a positive optical power; and a third lens unit having a negative optical power and having a lens element including a diffractive optical surface, wherein a zooming operation is performed by varying distances among the first through third lens units, wherein the zoom lens system fulfills the following conditions:

$$|\phi Dn/\phi 3|<0.06$$

$$-0.8 < \phi n/\phi W < -0.3$$

where $\phi Dn$ represents a diffractive optical power of the third lens unit;

$\phi 3$ represents a refractive optical power of the lens element including the diffractive optical surface;

$\phi n$ represents a composite optical power of diffractive and refractive optical powers of the third lens unit; and $\phi W$ represents a composite optical power of diffractive and refractive optical powers of the entire lens system in a shortest-focal-length condition.

9. A zoom lens system as claimed in claim 8, wherein the second lens unit has a lens element including a diffractive optical surface.

10. A zoom lens system as claimed in claim 8, wherein the second lens unit has a lens element including a diffractive optical surface, and wherein the zoom lens system fulfills the following condition:

$$-1.0 < \phi n/\phi p < -0.4$$

where $\phi n$ represents a composite optical power of diffractive and refractive optical powers of the third lens unit; and $\phi p$ represents a composite optical power of diffractive and refractive optical powers of the second lens unit.

11. A zoom lens system as claimed in claim 8, wherein the second lens unit has a lens element including a diffractive optical surface, and wherein the zoom lens system fulfills the following condition:

$$0.01 < |\phi Dp/\phi p| < 0.10$$

where $\phi Dp$ represents a diffractive optical power of the second lens unit; and $\phi p$ represents a composite optical power of diffractive and refractive optical powers of the second lens unit.

12. A zoom lens system as claimed in claim 8, wherein the second lens unit has a lens element including a diffractive optical surface, and wherein the zoom lens system fulfills the following condition:

$$|\phi Dp/\phi 2| < 0.06$$

where $\phi Dp$ represents a diffractive optical power of the second lens unit; and $\phi 2$ represents a refractive optical power of the lens element including the diffractive optical surface of the second lens unit.

13. A finite-conjugate-distance zoom lens system for reading a two-dimensional image comprising, from an enlargement side:

a first lens unit having a negative optical power and having a lens element including a diffractive optical surface;

a second lens unit having a positive optical power; and a third lens unit, wherein a zooming operation is performed by varying distances among the first through third lens units, wherein the zoom lens system fulfills the following conditions:

$$|\phi Dn/\phi 1| < 0.06$$

$$-0.8 < \phi n/\phi W < -0.3$$

where $\phi Dn$ represents a diffractive optical power of the first lens unit;

$\phi 1$ represents a refractive optical power of the lens element including the diffractive optical surface;

$\phi n$ represents a composite optical power of diffractive and refractive optical powers of the first lens unit; and $\phi W$ represents a composite optical power of diffractive and refractive optical powers of the entire lens system in a shortest-focal-length condition.

14. A finite-conjugate-distance zoom lens system as claimed in claim 13, wherein the third lens unit has a positive optical power.

15. A finite-conjugate-distance zoom lens system for reading a two-dimensional image comprising, from an enlargement side:

a first lens unit having a negative optical power;

a second lens unit having a positive optical power; and a third lens unit having a negative optical power and having a lens element including a diffractive optical surface, wherein a zooming operation is performed by varying distances among the first through third lens units, wherein the zoom lens system fulfills the following conditions:

$$|\phi Dn/\phi 3| < 0.06$$

$$-0.8 < \phi n/\phi W < -0.3$$

where $\phi Dn$ represents a diffractive optical power of the third lens unit;

$\phi 3$ represents a refractive optical power of the lens element including the diffractive optical surface;

$\phi n$ represents a composite optical power of diffractive and refractive optical powers of the third lens unit; and $\phi W$ represents a composite optical power of diffractive and refractive optical powers of the entire lens system in a shortest-focal-length condition.

* * * * *